United States Patent [19]

Smith, Jr. et al.

[11] Patent Number: 5,873,341
[45] Date of Patent: Feb. 23, 1999

[54] HIGH PERFORMANCE HEAD ASSEMBLY FOR AN INTERNAL COMBUSTION ENGINE

[75] Inventors: Richard William Smith, Jr., Orrville; Mark David Howard, Munroe Falls, both of Ohio

[73] Assignee: Autosales, Incorporated, Tallmadge, Ohio

[21] Appl. No.: 225,653

[22] Filed: Apr. 11, 1994

Related U.S. Application Data

[63] Continuation-in-part of Ser. No. 145,885, Oct. 29, 1993, abandoned.

[51] Int. Cl.⁶ .................................................. F02B 23/08
[52] U.S. Cl. ........................................................ 123/193.5
[58] Field of Search ............................. 123/193.5, 193.3, 123/657, 667, 188.14, 306, 90.1, 432, 90.27, 90.6

[56] References Cited

U.S. PATENT DOCUMENTS

| | | | |
|---|---|---|---|
| 4,159,011 | 6/1979 | Sperry | 123/193.5 |
| 4,606,308 | 8/1986 | Furlong | 123/193.5 |
| 4,686,948 | 8/1987 | Smith, Jr. et al. . | |
| 4,699,104 | 10/1987 | Okumura | 123/188.14 |
| 4,706,622 | 11/1987 | Cloke et al. . | |
| 4,773,382 | 9/1988 | Smith, Jr. et al. . | |
| 4,788,942 | 12/1988 | Pouring | 123/667 |
| 4,838,219 | 6/1989 | Feuling | 123/188.14 |
| 4,919,092 | 4/1990 | Smith, Jr. et al. . | |
| 4,976,231 | 12/1990 | Feuling | 123/188.14 |
| 5,042,440 | 8/1991 | Joseph . | |
| 5,076,224 | 12/1991 | Smith, Jr. et al. . | |
| 5,138,990 | 8/1992 | Smith, Jr. et al. . | |
| 5,148,781 | 9/1992 | Piatti | 123/90.27 |

FOREIGN PATENT DOCUMENTS

| | | | |
|---|---|---|---|
| 3838349 | 6/1989 | Germany | 123/657 |

*Primary Examiner*—Marguerite McMahon
*Attorney, Agent, or Firm*—Renner, Kenner, Greive, Bobak, Taylor & Weber

[57] ABSTRACT

A cylinder head assembly for an internal combustion engine. The cylinder head assembly has a deck surface for engaging an opposed deck surface on an engine block. A combustion chamber is recessed in the cylinder head assembly for each cylinder, and the combustion chambers each have first and second wedge portions. A first valve port penetrates the first wedge portion, and a valve seat is provided in the first valve port. The first valve seat is disposed at a first angle relative to the deck surface. A second valve port penetrates the second wedge portion, and a valve seat is provided in the second valve port. The second valve seat is disposed at a second angle relative to the mounting surface. The second angle is less than the first angle. Each valve seat has a valve element for controlling the ingress and egress of gas flowing to and from the chamber. The wedge portions permit a more erect valve orientation for the intake valve such that less scavenging of the fresh fuel/air charge will occur. The wedge portions also permit the exhaust valve and intake valve to moved to more advantageous locations relative to the combustion chamber. The relocation of the valves allows a more efficient placement of the spark plug, resulting in more even loading of the piston during the power stroke. The inlet passage which directs the fuel/air mixture to the combustion chamber has an independently unique configuration that improves atomization of the fuel/air mixture to achieve improved fuel economy and/or increased brake horsepower output.

10 Claims, 16 Drawing Sheets

HIGH PERFORMANCE HEAD ASSEMBLY FOR AN INTERNAL COMBUSTION ENGINE

RELATED APPLICATIONS

This application is a continuation-in-part application from U.S. application, Ser. No. 08/145,885, filed on Oct. 29, 1993 abandoned.

TECHNICAL FIELD

The present invention relates generally to internal combustion engines. More particularly, the present invention relates to cylinder head assemblies by which to secure high performance characteristics for such engines. Specifically, the present invention relates to cylinder head configurations having a unique angular orientation for the valves and a unique placement of the valves within the combustion chambers cooperatively to interact with novel intake flow passages that promote improved fuel/air mass flow, the maintenance of fuel in a vaporized state as it enters the combustion chambers, and correspondingly improved fuel economy and power delivery.

BACKGROUND OF THE INVENTION

High performance engines, supported by engine manufacturers, are much in demand by auto racing enthusiasts as well as by individuals who simply desire higher performance than available from original equipment manufacturer (O.E.M.) engines. However, high performance engines are generally not available to those race teams, or individual car owners, who are not directly associated with major manufacturers of automotive engines, auto components or lubricant makers. Thus, low budget race teams, and individuals, must depend on standard production engines that can be modified, preferably at low cost.

Engine manufacturers do not, as a general rule, mass produce high performance race engines. The high performance engines that are manufactured require specialized tooling and are, therefore, relatively expensive. As a result, auto racing enthusiasts will generally modify production engines with components that are available from specialized dealers, or manufacturers, at a reasonable cost. Engine components which are most commonly modified are the head, the valve train components (e.g., the cam shafts), the pistons and the throw rods, and those components are readily available from smaller specialty manufacturers. However, the cylinder head, and its components, are the most popular performance increasing products.

High performance cylinder head designs generally incorporate specially shaped chambers that serve to facilitate, or increase: fuel/air mass flow; fuel/air mixing; and, compression. As such, the head chambers have utilized hemispherical, or wedge, shapes, in order to provide sufficient room for the operation of the valves which must move linearly into and out of the combustion chamber at an angle relative to the piston head. The valve size, as well as the degree and the rapidity with which they open and close, have a definite effect on the amount of air which can be taken into the cylinders. Because the quantity of the fuel/air mixture which can be ingested into the cylinder to be available within the cylinder during combustion can have a significant affect on the power development and the maximum operating speed of the engine, the valve opening and closing characteristics are given careful attention.

One particularly successful improvement in high performance heads is known from U.S. Pat. No. 4,686,948, which issued to Smith et al on Aug. 18, 1987. The '948 patent is owned by the assignee of the present invention and describes an engine head as having a wedge-shaped combustion chamber with a flat quenching surface. The wedge-shaped combustion chamber described therein results in improved fuel consumption and simultaneous high brake horsepower.

The intake passage of the head described in the '948 patent has a velocity increasing restriction adjacent the inlet valve which improves the flow of atomized fuel and directs it in an even fashion around the inlet valve. The result of this structural arrangement increases the velocity of the incoming fuel charge without deleteriously effecting the volume of incoming air. This patent and others have directed the improvements mainly to the wedge-shaped configuration of the combustion chamber.

U.S. Pat. No. 4,919,092 which issued to Smith et al on Apr. 24, 1990—and which is also owned by the assignee of the present invention—utilizes a metal mass buildup positioned about the inlet valve, in conjunction with an improved intake passage, to draw the fuel/air charge into the chamber in a helical flow pattern. The intake passageway described in the '092 patent is useful in drawing a rich fuel/air mixture through the inlet valve at a location remote from the exhaust valve while introducing a lean fuel/air mixture through that portion of the inlet port that is located in closer proximity to the exhaust valve. This arrangement, of course, is intended to limit the amount of scavenging—i.e.: the fuel passing directly between the inlet and exhaust valve during valve overlap (that period of time during which both the intake and the exhaust valves are simultaneously open).

It is well known that fuel/air mixtures often contain some droplets of fuel which are not properly atomized and which, if delivered to the chamber, will generally be scavenged prior to the compression stroke, thereby limiting the energy available. Another prior art teaching is found in U.S. Pat. No. 5,076,224 which issued to Smith et al on Dec. 31, 1991, and which is also owned by the assignee of the present invention. The '224 patent discloses a high performance head wherein the inlet passage upstream of the intake valve has an arcuate-shaped, rounded boss that is positioned to direct the heavier droplets of fuel toward a heated wall, or floor, of the inlet passage. The fuel droplets will be atomized as they impact the heated wall. The operation of the '224 structure depends on the heat conduction through the walls of the inlet manifold, and to assist with the desired heat transfer, passages are provided through which the exhaust gas may circulate.

The prior art, including the specific patents discussed in the preceding paragraphs, all have the intake and exhaust valves disposed in a coplanar relation. In addition, the center of the valve heads are aligned with a longitudinal plane along the reciprocating axis of the piston when the valves are closed. The valves are disposed at a common angle, generally on the order of about twenty-three degrees ( 23°), relative to the longitudinal plane. This valve angle provides the space necessary to permit the added material that aids in directing the fuel/air mixture during ingress and egress from the combustion chamber.

SUMMARY OF THE INVENTION

It is, therefore, one primary object of the present invention to provide an improved cylinder head having a modified, and improved, generally wedge-shaped combustion chamber.

It is also a primary object of the present invention to provide an improved cylinder head which assures increased atomization of the fuel entering the combustion chamber.

It is yet a third primary object of the present invention to provide an improved cylinder head which allows a significant increase in the brake horsepower, if desired.

It is a further object of the present invention to provide an improved engine cylinder head, as above, having reduced scavenging losses.

It is still another object of the present invention to provide an improved cylinder head, as above, which utilizes intake valves and exhaust valves disposed for reciprocation on non-coplanar axes.

It is yet another object of the present invention to provide an improved cylinder head, as above, which permits positioning the spark plug at a location, and at an orientation, that maximizes the application of the combustion-produced forces most effectively and efficiently to the piston head.

It is yet a further object of the present invention to provide an improved cylinder head, as above, which effects improved retention of atomized fuel in the combustion chamber by reducing the scavenging of the fuel/air mixture into the exhaust port during overlap.

It is still a further object of this invention to provide an improved cylinder head, as above, and in accordance with the foregoing objects, wherein the improved cylinder head is directly exchangeable with a conventional head in order to improve the performance of the engine which receives the improved cylinder head.

These and other objects of the invention, as well as the advantages thereof over existing and prior art forms, which will be apparent in view of the following detailed specification, are accomplished by means hereinafter described and claimed.

In order to provide for reduced scavenging of the intake fuel/air charge, it has been found beneficial to dispose the intake valve at an angle different from the exhaust valve. This is accomplished by adopting a unique configuration for the generally wedge-shaped combustion chamber that is formed in the head. In a cylinder head embodying the concepts of the present invention the intake valve is disposed with the stem thereof at an angle on the order of about thirteen degrees (13°) with respect to a plane coincident with the reciprocating axis of the piston while the exhaust valve remains at the angle of about twenty-three degrees (23°) with respect to the same reference plane, which is more common with O.E.M heads. That angular disposition flattens the angle of the valve head relative to the upper surface of the piston and thus the decks, or mounting surfaces, on the head and the engine block. This angular disposition of the intake valve relative to the head surface of the piston allows retention of the desired compression ratio, maintains valve clearance during operation of the engine and also accomplishes the desired flow of the fuel/air mass into the combustion chamber.

The aforesaid angular disposition of the valves achieved by the improved configuration of the generally wedge-shaped combustion chamber in the cylinder head achieves an improved push rod orientation. This provides additional, unexpected economic benefits in that a new cam shaft is not mandatory with the improved cylinder head.

The head assembly is of the overhead valve, push rod variety wherein the intake manifold connects to the center, and one side of the cylinder head. In a V-8 block engine the intake manifold connects to the head toward the center of the "V", and for convenience, that connection shall be designated as being on the "front" of the head. With that same frame of reference the exhaust manifold connects to the outside, or rear, of the head.

The valve seats for each cylinder are also offset from their normal, in-line, disposition. The offset disposition not only maximizes the clearance between the intake valve and the adjacent wall of the wedge-like recess, or combustion chamber, in the cylinder head but also maximizes the shrouding effect of the wedge wall adjacent the exhaust port. The exhaust passage within the head may be provided with a flow restriction, such as in the form of a chordal area, adjacent to, but downstream of, the exhaust valve seat and at a location where the intake and exhaust ports are closest together. The repositioned valves and exhaust flow restriction minimizes cross flow scavenging between the intake and exhaust ports, but with sufficient repositioning of the valves, cross flow can be minimized without the use of the flow restriction. The changed angular disposition of the intake valve minimizes the clearance between the intake valve and the piston head.

One benefit achieved through the dissimilar angular orientation of the valve stems is that more of the fuel/air charge is retained in the cylinder for compression. That is, the scavenging which occurs during valve overlap is minimized. This retention of the fuel charge is not to be equated with increased flow of the fuel/air mass which, of course, also increases the charge available for combustion. However, increased flow of the fuel/air mass tends to increase the amount of fuel/air mixture that is scavenged into the exhaust system. Scavenging results in increased heat generation in the exhaust manifold and requires increased cooling. Thus, the present invention improves the fuel/air charge retained within the cylinder without increasing the exhaust heat. This result increases the efficiency of the engine and improves fuel consumption.

There are other structural aspects of the present invention that improve retention and reduce scavenging. The uniquely configured, generally wedge-shaped, combustion chamber permits the exhaust port to be positioned closer to one wall of the generally wedge-shaped combustion chamber, thereby shrouding one side of the exhaust port. This shrouding of one side of the exhaust port tends to enhance peripheral flow of the exhaust gases into the exhaust port. The above-mentioned restriction, if desired, or required, is added to the exhaust port in diametric opposition to the shrouding, and thus on that side of the exhaust port closest to the intake port. This flow restriction, when used, also tends to increase the velocity of the exhaust flow and to enhance the circumferential flow into the exhaust port, thereby minimizing the anticipated radial flow. Minimizing radial flow reduces any scavenging flow from the intake port directly into the exhaust port and thereby contributes to the retention of a maximum amount of the fuel/air charge entering the combustion chamber.

Repositioning the intake and exhaust valves unshrouds the intake port, which increases the fuel/air mass entering the cylinder during the intake stroke of the engine. The valve repositioning also permits improved placement of the spark plug. With the unique combustion chamber and valve positioning of the present invention, the spark plug is disposed in the head such that the longitudinal axis thereof will intersect the piston head along the longitudinal plane of the piston and the wrist pin when the piston is at thirty degrees (30°) before top-dead-center. It has been found that this orientation applies substantially uniform pressure loading across the head of the piston during flame propagation as the fuel/air mixture is ignited by the spark plug.

There have always been some droplets of liquid fuel entrained in the fuel/air charge, even with the prior art improvements previously discussed herein. The liquid fuel droplets appear to flow along the locus of points defining the minimum pressure within the intake passage. To reduce the amount of liquid fuel in the fuel/air stream another feature, which contributes to the atomization of fuel immediately prior to entry into the compression chamber, is incorporated into the head within the intake fuel passage. Specifically, a flow restriction in the nature of a throat, or choke, is located in the intake passage. The fuel/air mixture increases in velocity when passing through the choke, which, as is well known, will reduce the pressure at the center of the flowing fuel/air mass. Any liquid fuel droplets within that mass will, therefore, tend to stream within the center of the flow.

Downstream of the choke, the fuel/air flow undergoes a sharp, angular change in direction just prior the inlet port. A knife edge protuberance is located in alignment with the center of the flow stream just beyond the angular change of direction forced upon the fuel/air mass. Due to the higher inertia of the liquid droplets, as compared with atomized fuel, they resist the directional change to a greater degree, and they impact against the protuberance. The impact itself tends to shatter the droplets of fuel suspended within the fuel/air mixture. It has been found that with the incorporation of even a minimal protuberance fuel economy is increased, but with the protuberance maximized the power output is significantly increased in conjunction with the increased fuel economy.

The fragmented fuel droplets then traverse the knife edge on the protuberance in a manner that further shears, and atomizes, the fuel droplets. The fragmented and sheared droplets are then caught in a turbulent pocket, or eddy, created by the pattern of the fuel/air mass flowing across the knife edge. The turbulent flow pattern further improves the atomization of the fuel such that only a minimal amount of fuel, in liquid form, will reach the combustion chamber. As a result of this unique arrangement, the fuel/air mixture is not only in better condition for the most effective combustion, but the fuel is not as likely to be scavenged as it is when liquid droplets of the fuel are present.

Unlike the prior art, the present invention does not require heated passages in the manifold or in the head. While such heating will improve atomization, the present invention does not require such action. In fact, increasing the temperature of the fuel/air charge entering the combustion chamber reduces the energy available by combustion. Accordingly, introducing the fuel/air mixture at a lower temperature results in a greater change in temperature during combustion and therefore provides a greater amount of energy to drive the piston. Thus, the improved fuel atomization achieved with the present invention: provides more energy from the fuel/air mixture; is available immediately upon engine start-up rather than only after engine warmup; and, results in improved emission characteristics.

Even though the present invention includes a change in the orientation of the intake valve, the improved cylinder head will fit, without modification, on a standard engine block such as those currently provided, or previously manufactured, by the leading automotive manufacturers such as General Motors Corporation or The Ford Motor Company. Substitution of the improved cylinder head for existing cylinder heads can be accomplished without disposing of any of the standard parts, except for the old head itself and perhaps the valves.

To acquaint persons skilled in the arts most closely related to the present invention, one preferred, and one modestly varied, embodiment of a high performance head that illustrates the best modes now contemplated for putting the invention into practice are described herein by, and with reference to, the annexed drawings that form a part of the specification. The exemplary high performance heads are described in detail without attempting to show all of the various forms and modifications in which the invention might be embodied. As such, the embodiments shown and described herein are illustrative, and as will become apparent to those skilled in these arts, can be modified in numerous ways within the spirit and scope of the invention; the invention being measured by the appended claims and not by the details of the specification.

DESCRIPTION OF AN EXEMPLARY EMBODIMENT

One representative form of a high performance head embodying the concepts of the present invention is designated generally by the numeral 10 on FIGS. 5 through 10, inclusive, of the accompanying drawings. In order to facilitate an understanding as to the structural distinctions between the improved head 10 and a typical high performance head according to the prior art, a brief description of a cylinder head 20 that is representative of the prior art is depicted in FIGS. 1 through 4.

Description of a Typical Prior Art Head

Figure 1:
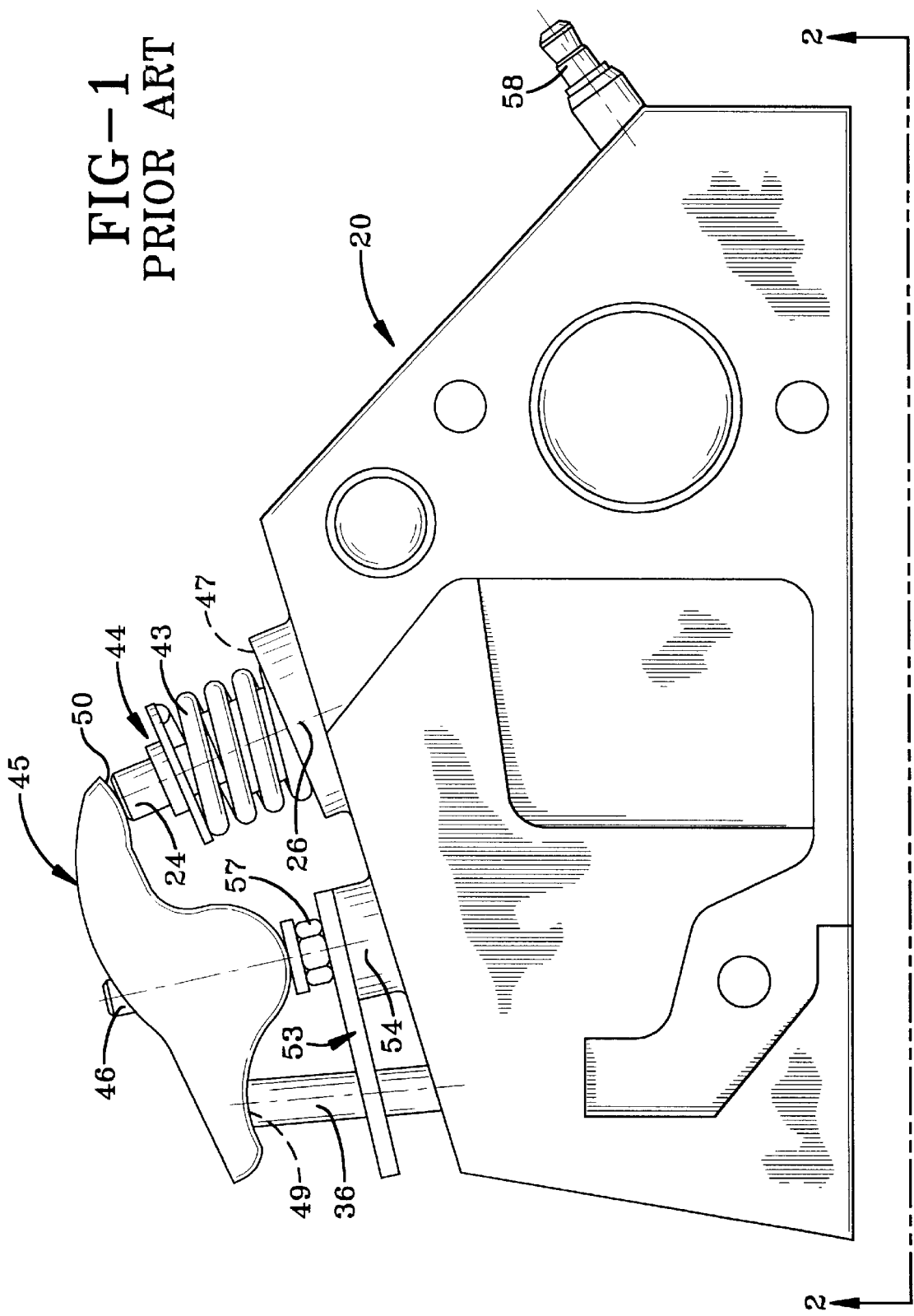
FIG. 1 is an end elevation of a representative, high performance, prior art cylinder head for an internal combustion engine.
Figure 2:
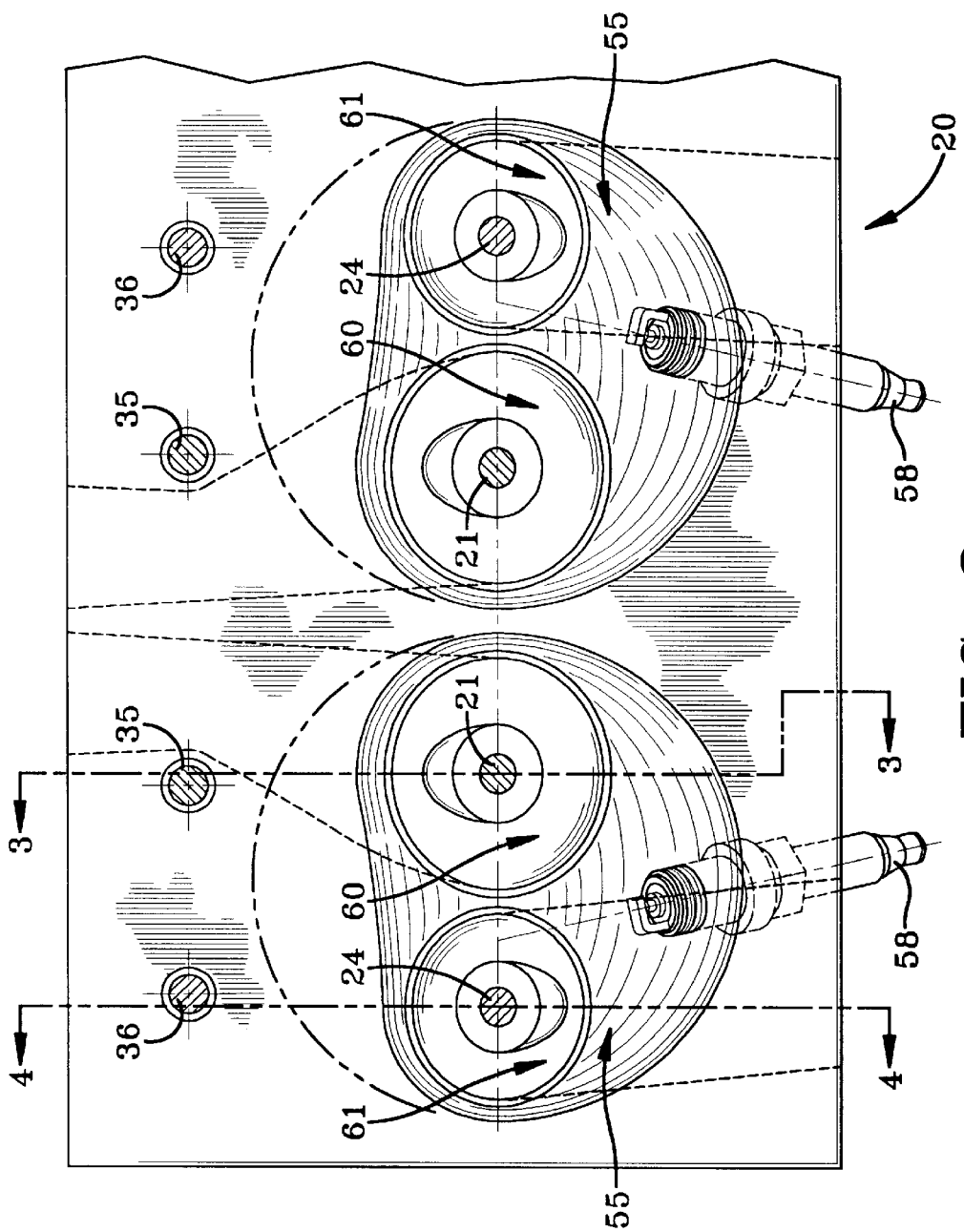
FIG. 2 is a reduced, bottom plan view of the prior art cylinder head taken substantially along line 2—2 of FIG. 1 to depict that portion of the combustion chamber included within the head.
Figure 3:
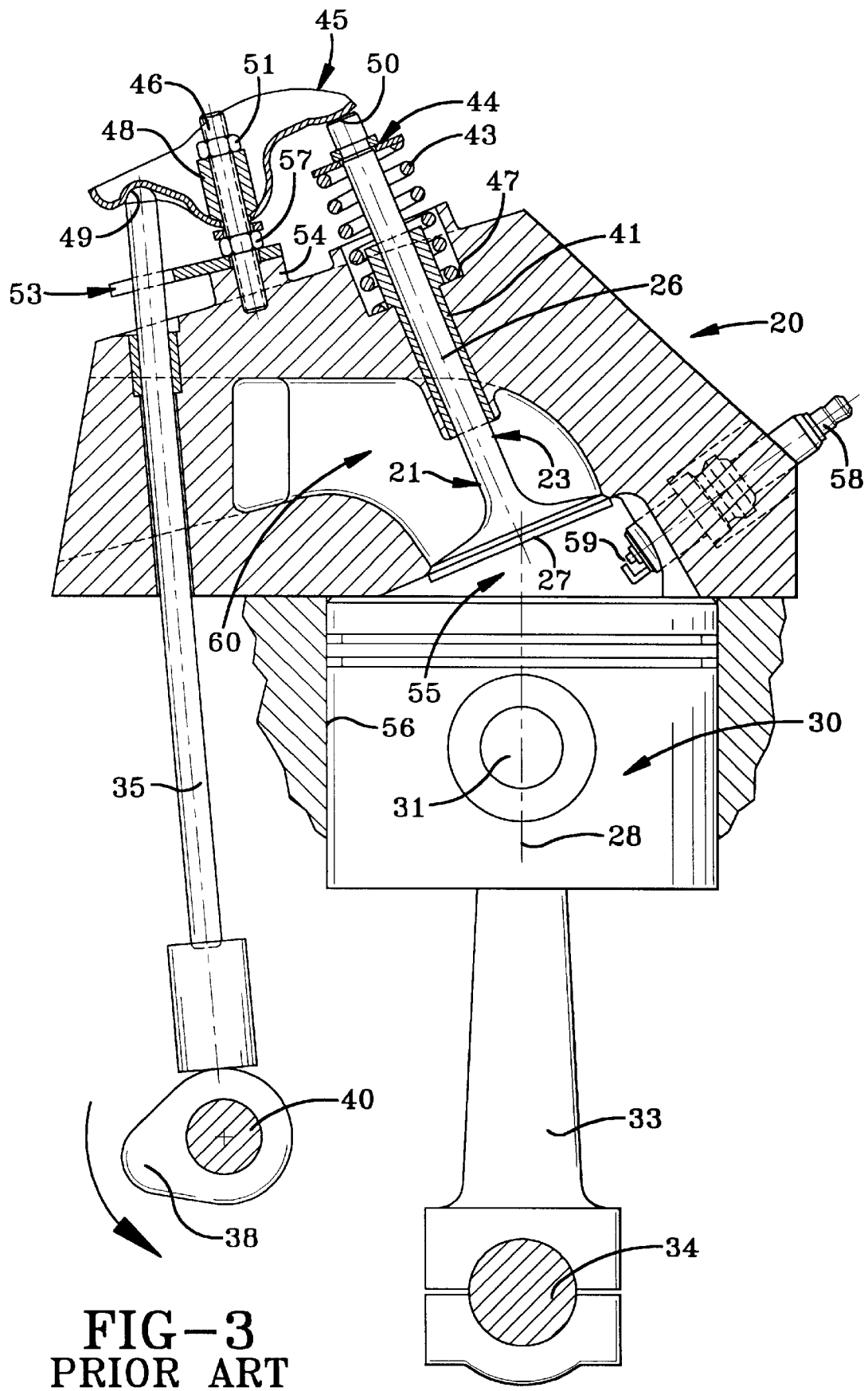
FIG. 3 is a slightly reduced cross section taken substantially along line 3—3 of FIG. 2 which depicts a representative configuration of an intake chamber and port utilized in the prior art head configuration, a lifter rod assembly and a piston being included in order to provide a proper frame of reference.
Figure 4:
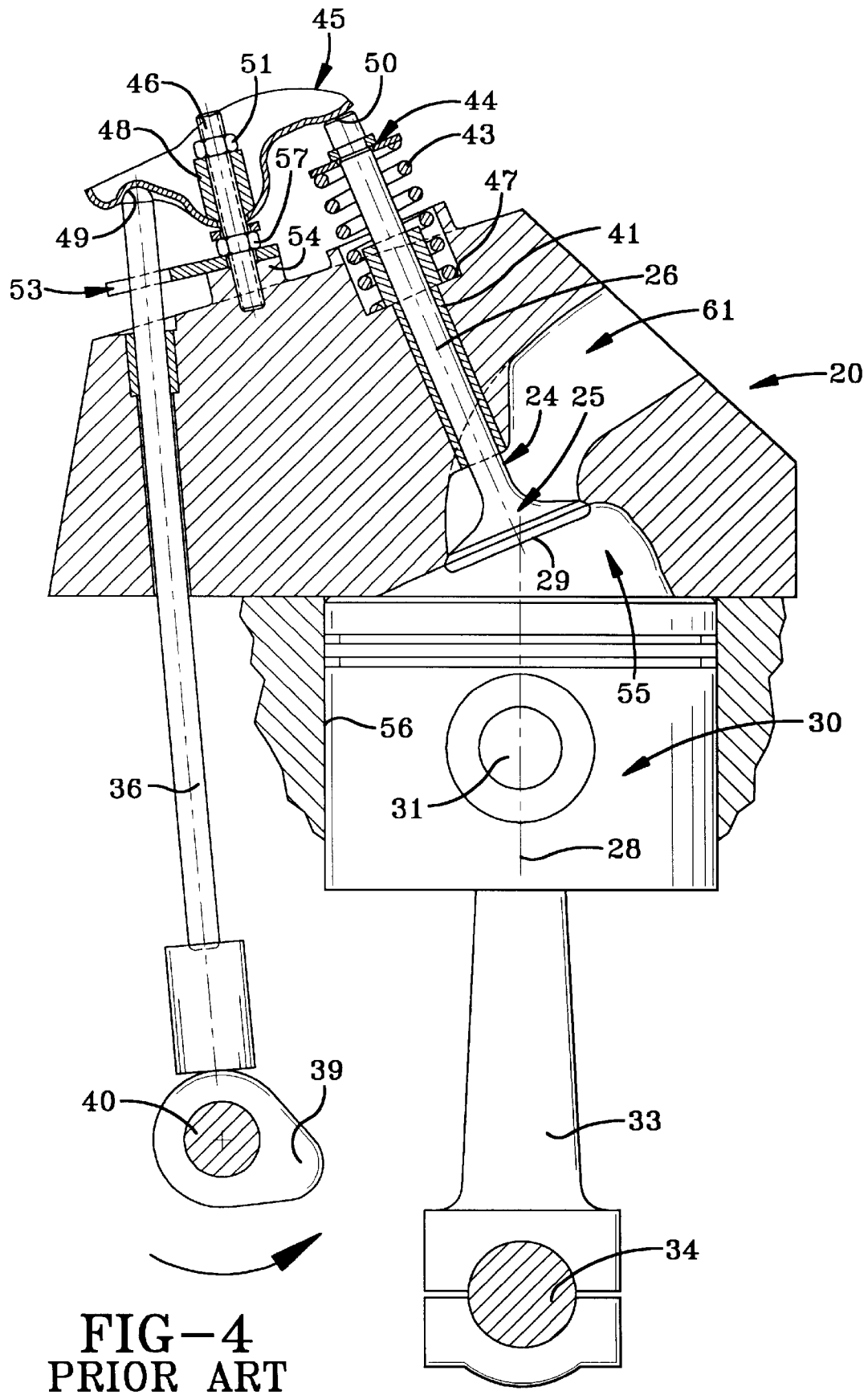
FIG. 4 is a slightly reduced cross section taken substantially along line 4—4 of FIG. 2 which depicts a representative configuration of an exhaust chamber utilized in the prior art head configuration, a lifter rod assembly and a piston being included in order to provide a proper frame of reference.
Figure 5:
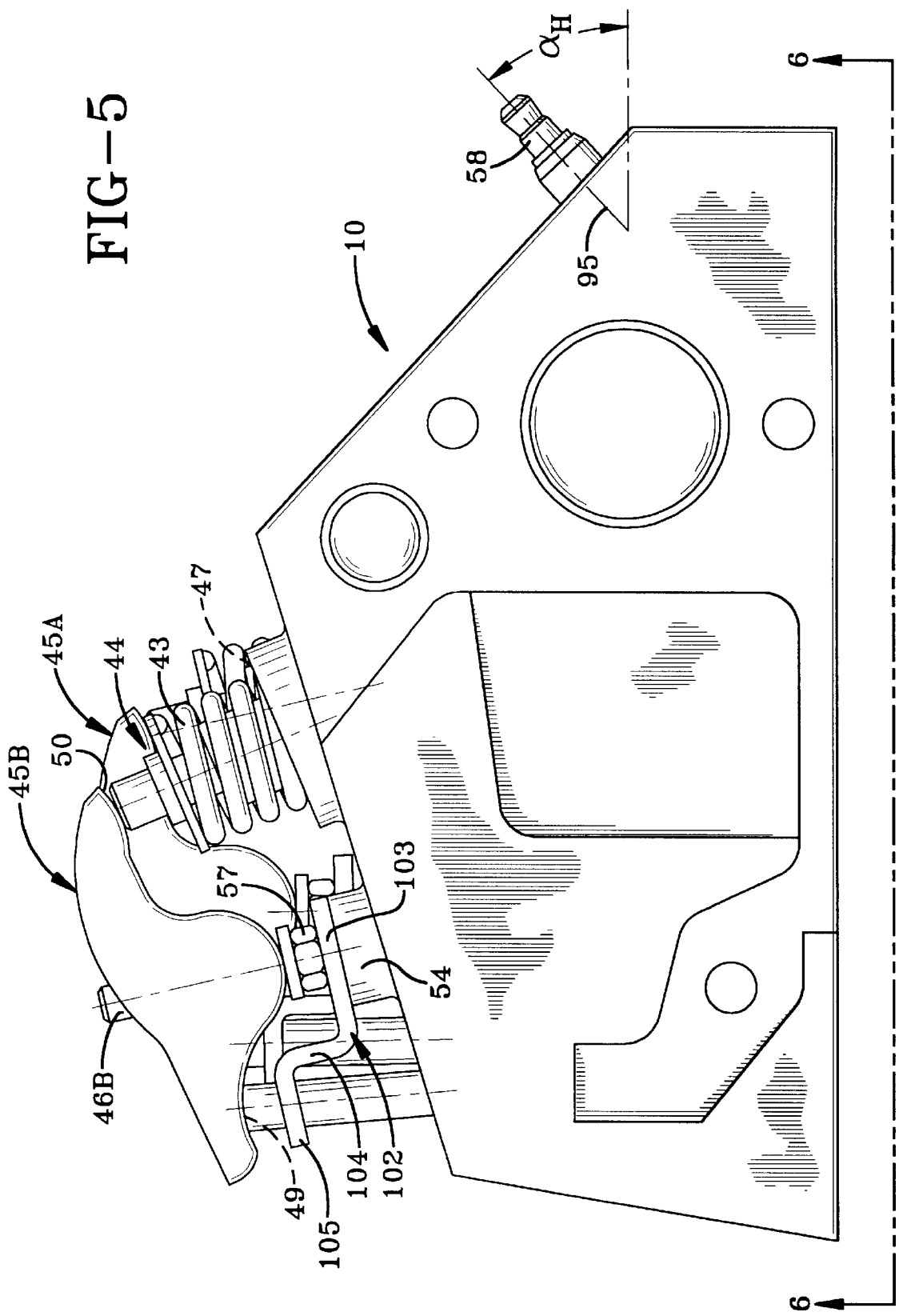
FIG. 5 is an end elevation similar to FIG. 1, but depicting a high performance head embodying the concepts of the present invention.

In the prior art head 20, the valve stems 21 of the intake valves 23 (FIG. 3) and the valve stems 24 of the exhaust valves 25 (FIG. 4) are disposed in coplanar alignment along the cylinder head 20 (most apparent in FIGS. 1 and 2). As best seen in FIGS. 3 and 4, longitudinal center lines of all the valve sterns 21 and 24 are disposed in alignment with a common first plane, as represented at 26. When the valves 23 and 25 are both in the closed position, a common second plane, represented at 28, passes through the longitudinal axis along which each piston 30 reciprocates as well as along the longitudinal axis of the wrist pin 31 by which each piston 30 is connected to its respective throw rod 33. The second plane 28 intersects the first plane 26 at the surface of the valve head 27 on the intake valve 23 as well as at the surface 29 on the exhaust valve 25. The throw rods 33, as is well known, are, in turn, operatively connected to the crankshaft 34 of the engine (not shown) which includes the head 20.

The valves 23 and 25 are forced to open by their respective push rods 35 and 36 which are driven by the respective cam lobes 38 and 39 that are presented from a camshaft 40 to pivot the rocker 45 against the appropriate valve stems 21 or 24. The valve stems 21 and 24 are each slidably disposed for reciprocation in bushings 41 within the head 20, and the respective valves 23 and 25 are urged to the closed position depicted in the drawings by individual compression valve springs 43. Conventional keeper assemblies 44 removably secure each valve stem 21 and 24 to its respective valve spring 43 and transfer the biasing action applied by the springs 43 between the fixed spring seats 47 and the keeper assemblies 44 carried on the valve stems 21 and 24. Valve keeper assemblies 44 are well-known such that those familiar with the art of engine design will be aware of the many forms that these devices can take.

Each rocker arm 45 is pivotally mounted on the head 20 by a stud 46 secured within a mounting boss 54. As is well-known, each rocker arm 45 has a substantially hemi- spherical seat 49 engaged by the push rods 35 or 36. Each rocker arm 45 also has a rounded actuating surface 50 which contacts the upper end of the valve stem 21 or 24 with which it is operatively associated. A nut 51 secures the rocker arm 45 on the stud 46 and cooperates with a bushing 48 to control valve lash, as is well known to the art. Structural arrangements for adjustably mounting a rocker arm to a supporting stud have been in use for a sufficiently long period of time that a more complete structural, or operational, description thereof is not believed necessary herein.

The push rod assemblies 35 and 36 may each be stabilized by the plurality of bifurcated brackets 53 that are supported from the studs 46 and secured in position by a second nut 57.

The prior art cylinder head 20 has a plurality of wedge shaped combustion chambers 55—i.e.: one chamber 55 per cylinder 56. Each wedge-shaped combustion chamber 55 accommodates one inlet valve 23 and one exhaust valve 25. Each combustion chamber 55 is also provided with a spark plug 58. As depicted, the wedge-shaped combustion chamber 55 is exposed to the gap 59 of the plug 58 across which a spark is selectively generated. The spark ignites the fuel/air charge that is introduced into the cylinder 56 through the wedge-shaped combustion chamber 55 from an intake passage 60 when the intake valve 23 is selectively opened by the lobes 38 on the rotating camshaft 40.

After the fuel/air charge has been ignited by the spark plug 58, the piston 30 will be driven toward bottom-dead-center by the gas expanding within the cylinder 56. This motion of the piston 30 constitutes the power stroke in the operating cycle of the engine. During the power stroke the engine delivers torque to the engine crankshaft 34 in a well known manner. At substantially bottom-dead-center, or slightly before, the exhaust valve 25 will be opened by the cam lobe 39 to permit the spent charge to be expelled from the cylinder 56 through an exhaust passage 61 as the piston 30 moves toward top-dead-center during the exhaust stroke of the engine cycle.

Generally at top-dead-center following the exhaust stroke, the intake valve 23 and the exhaust valve 25 will both be open during a very brief, overlapping period of time. This valve overlap assures that the maximum amount of the spent charge is expelled and promotes the earliest possible introduction of the next fuel/air charge into the cylinder 56 during the intake stroke. The intake valve 23 remains open during the entire intake stroke. As the piston 30 passes bottom-dead-center at the end of the intake stroke, the intake valve 23 is closed by the action of the valve spring 43 and the orientation of the appropriate intake lobe 38. The fuel/air charge introduced into the cylinder 56 during the intake stroke is then compressed as the piston 30 moves toward top-dead-center during the compression stroke. Prior to the time that the piston reaches top-dead-center, the spark plug 58 is "fired" to begin the ignition of the fresh fuel/air charge. The exact time at which the spark plug 58 "fires" is determined by a number of factors such as engine speed and the pressure level of the fuel/air mixture in the intake passage 60. It will be appreciated that those skilled in the art of engine design will be fully conversant with these procedures.

Description of the Improved Cylinder Heads

FIGS. 5, 6, 7, 8, 9 and 10 describe an engine head assembly 10 constructed in accordance with the present invention. Many of the components present in the engine head assembly 20 can be utilized with the improved cylinder head 10. Such components include the rocker arms 45, the push rods 35 and 36 and the spark plugs 58, to name a few. The components most likely to be reused, and which appear in FIGS. 5, 6, 7, 8, 9 and 10 as well as FIGS. 6A, 8A, 9A and 10A, will be designated with the same numerical identifiers used with FIGS. 1 through 4. As such, the description of the structure and function of those components will not be repeated during the following discussion.

The head 10 has a generally wedge-shaped combustion chamber 65 that is made up of an exhaust wedge portion 66 with an exhaust port 68 and an intake wedge portion 69 with an intake port 70. The wedge portions 66 and 69 are not coplanar, as they are in the prior art, for very important reasons that will be hereinafter more fully described. The exhaust wedge portion 66 (FIG. 9) has an exhaust valve seat 71 which circumscribes the exhaust port 68 to cooperate with an exhaust valve 73 having a valve head 74 and a stem portion 75. The intake wedge portion 69 (FIG. 8) similarly has an intake valve seat 76 which circumscribes the intake port 70 to cooperate with an intake valve 78 having a valve head 79 and a stem portion 80. It is not absolutely necessary to replace the exhaust and intake valves 25 and 23 used in the prior art cylinder head 20 with the respective valves 73 and 78 depicted in the improved head 10. However, in many high performance engines it is desirable to use special valves for improved cooling and reduced inertia.

The heads 74 and 79 on the exhaust and intake valves 73 and 78, respectively, though of different diameters in order to match the different diameters of the respective valve seats 71 and 76, are frusto-conical in shape. The exhaust valve seat 71 cooperates with the frusto-conical rim 81 of the exhaust valve head 74 to seal the combustion chamber 65 from the exhaust passage 85 in the cylinder head 10. The intake valve seat 76 similarly cooperates with a frusto-conical rim 84 of the intake valve head 79 to seal the chamber 65 from the intake passage 83 in the cylinder head 10. As shown, the base of each of the opposed frusto-conical shapes is on that side of the shape closest to the combustion chamber 65 in order for each of the valve heads 74 and 79 to move into their respective wedge portions 66 and 69 as the valves 73 and 78 are selectively opened.

Figure 7:
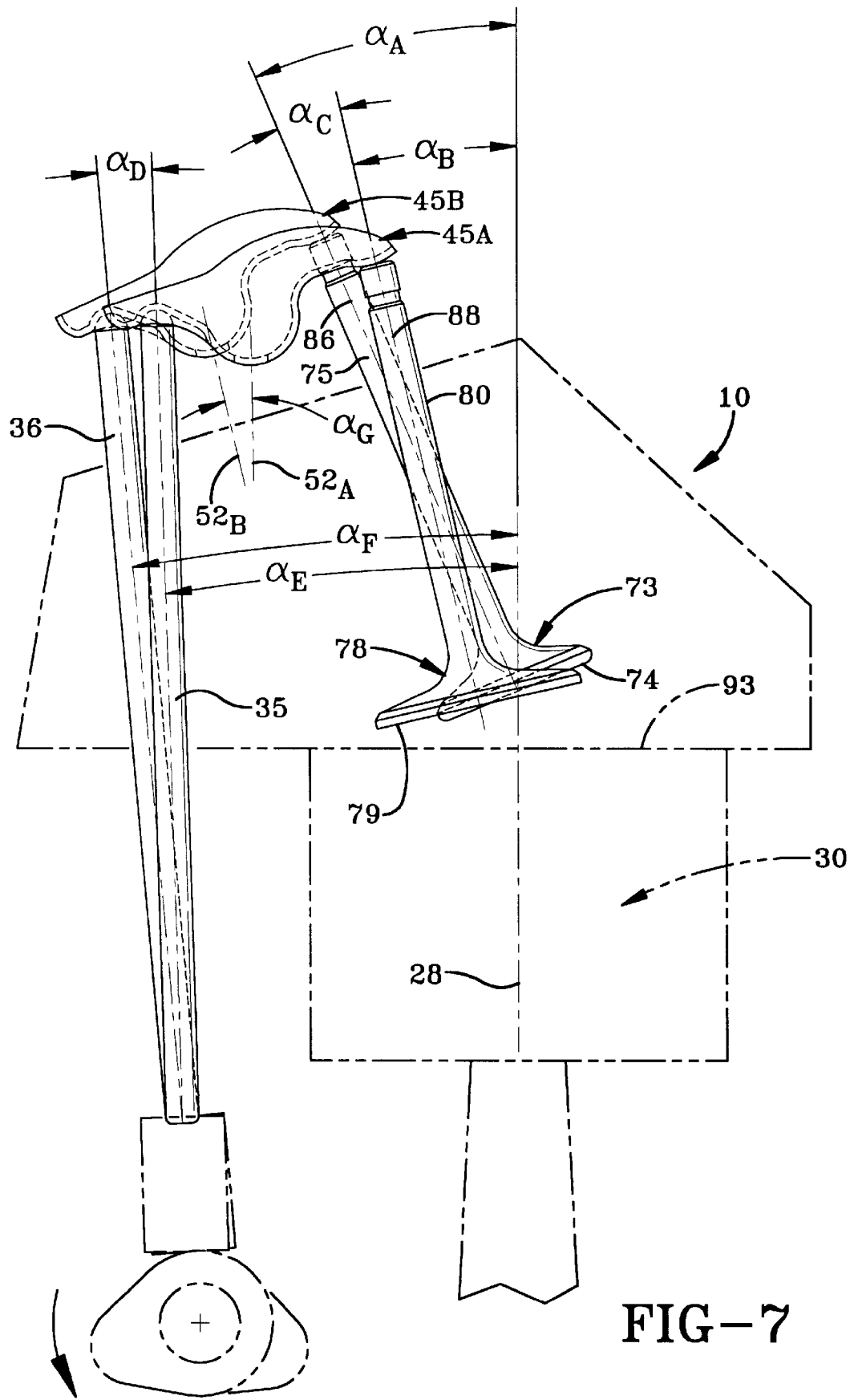
FIG. 7 is a diagrammatic layout similar to FIG. 5 but with the structure of the head itself removed to depict the angular relationship of the valve stems, the vertical offset of the intake and exhaust valves relative to the machined deck surface on the head which engages an opposed, machine deck surface on the engine block and the lateral offsets of the valves relative to the centerline of the piston served by the two valves depicted.
Figure 8:
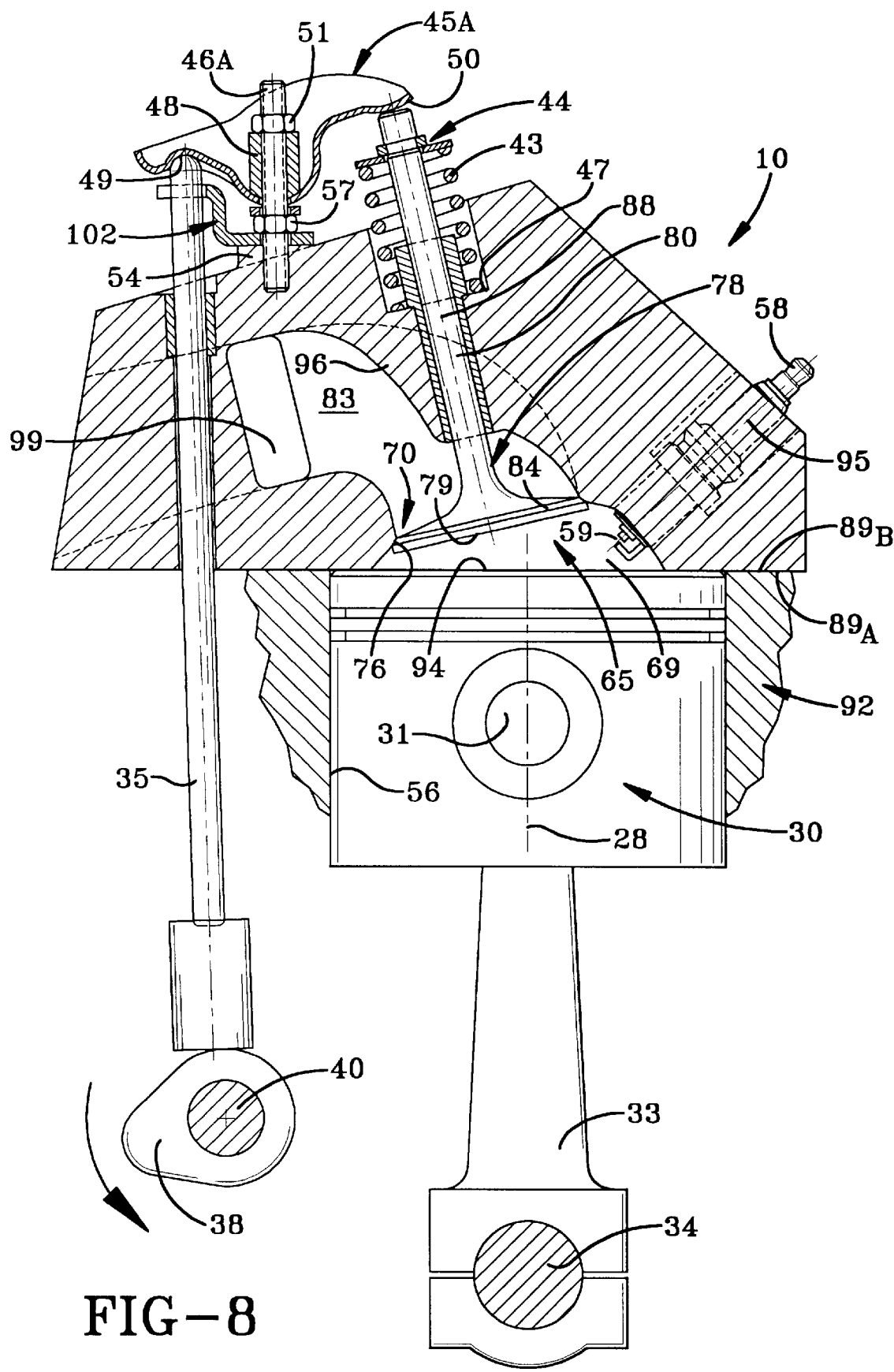
FIG. 8 is a cross section of reduced scale taken substantially along line 8—8 of FIG. 6 which depicts the configuration of an intake chamber and intake port utilized in the improved high performance head embodying the concepts of the present invention, a lifter rod assembly and a piston being included in order to provide a proper frame of reference.
Figure 8A:
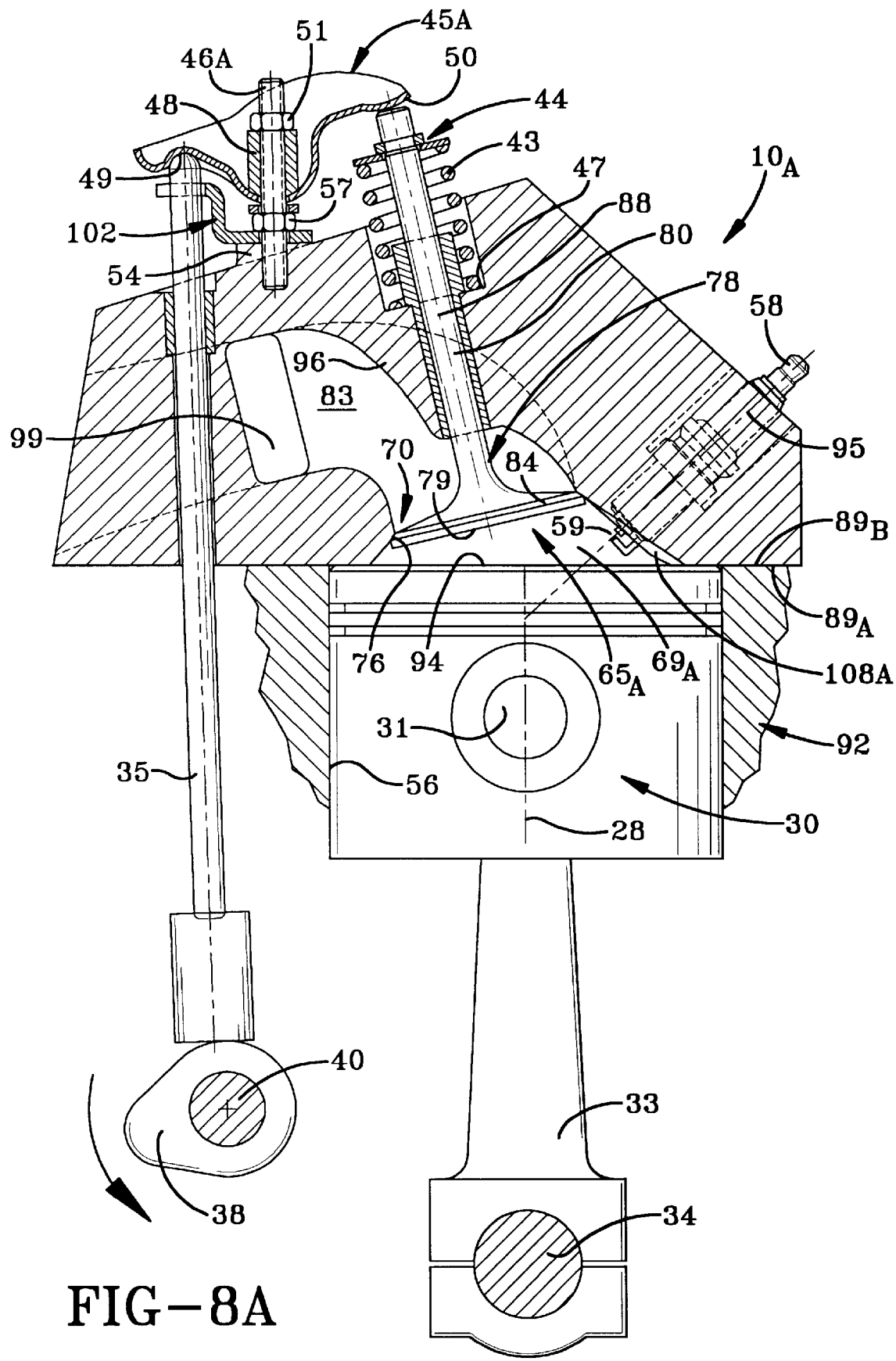
FIG. 8A is a view similar to FIG. 8 but taken substantially along line 8A—8A of FIG. 6A.
Figure 9:
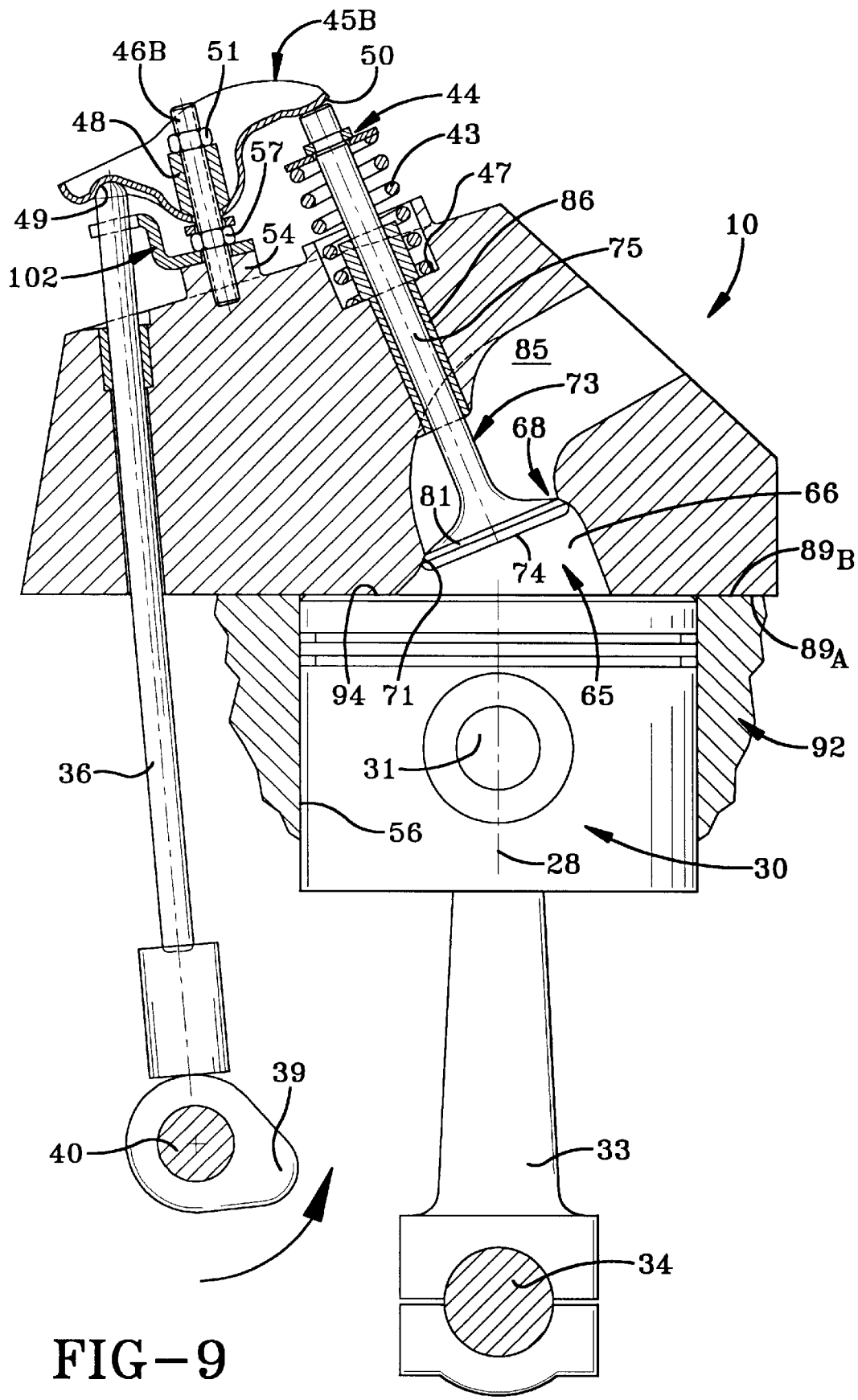
FIG. 9 is also a cross section of reduced scale taken substantially alone line 9—9 of FIG. 6 which depicts the configuration of an exhaust chamber and exhaust port utilized in the improved high performance head embodying the concepts of the present invention, a lifter rod assembly and a piston also being included in order to provide a proper frame of reference.
Figure 9A:
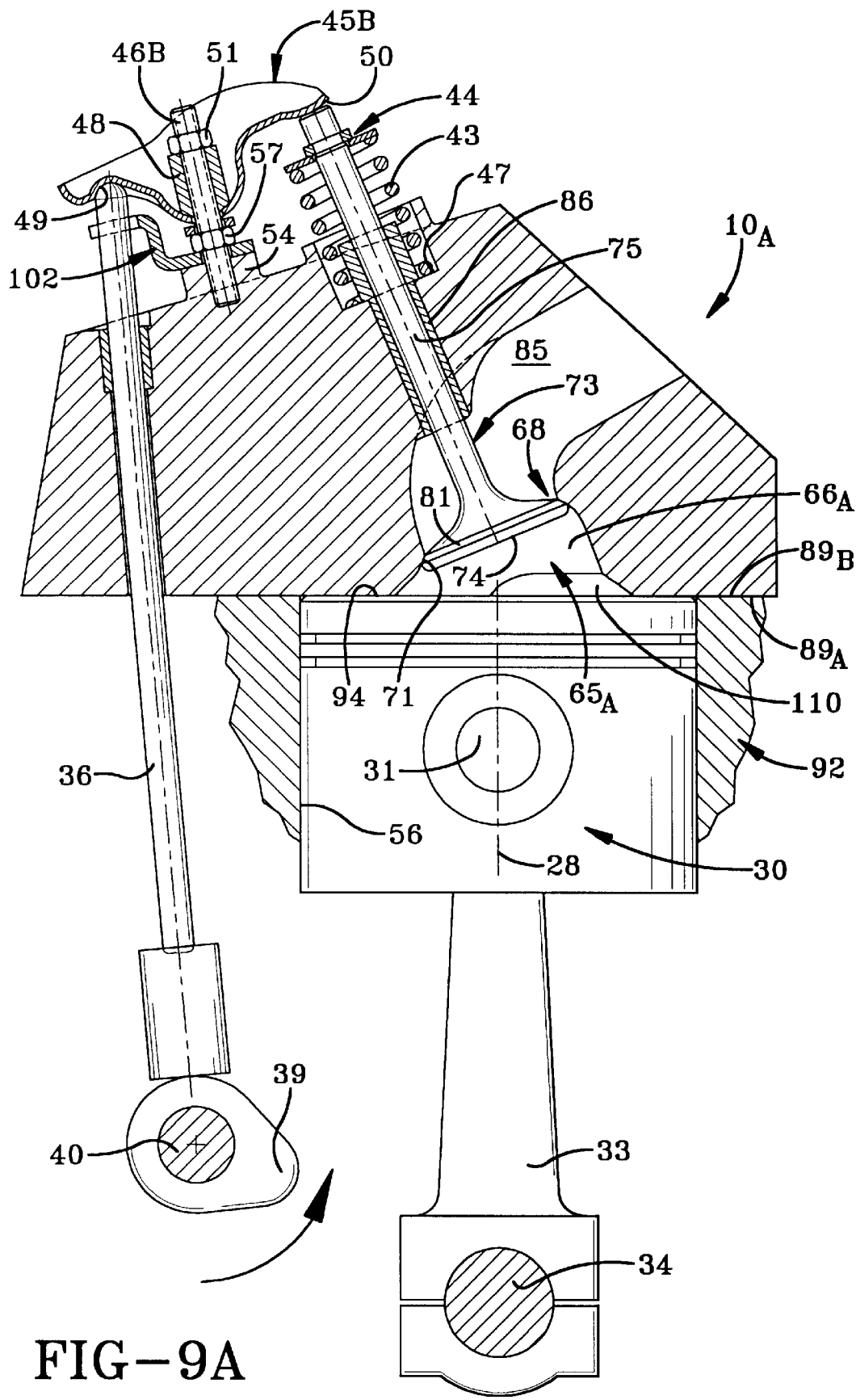
FIG. 9A is a view similar to FIG. 9, but taken substantially along line 9A—9A of FIG. 6A.

As best seen in FIGS. 7 through 9, the longitudinal, or reciprocating, axis 86 of the exhaust valves 73 intersect the second plane 28 (along which the pistons 30 reciprocate) at an angle $\alpha_A$ that is preferably on the order of about twenty-three degrees (23°), and the longitudinal, or reciprocating, axis 88 of the intake valves 78 intersects the second plane 28 at an angle $\alpha_B$ that is preferably on the order of about thirteen degrees (13°). As such, the angular disparity between the valve stems 75 and 80 is designated as an angle $\alpha_C$ that is preferably on the order of about ten degrees (10°). To accomplish this angular difference, the intake wedge portion 69 of the generally wedge-shaped chamber 65 is formed at a shallower angle relative to the deck, or mounting surface, 89A on the head 10. This permits the intake valve 78 to be inclined relative to the exhaust valve 73. By thus effectively flattening the orientation of the valve head 79 on the intake valve 78 relative to the deck 89B on the cylinder head 10, ample clearance between the valve head 79 and the piston 30 is assured, even if the intake valve 78 remains open as the piston 30 approaches top-dead-center.

The disparate angularity $\alpha_C$ between the valve stems 75 and 80 requires that the studs 46A be mounted differently than the studs 46B. Preferably, the studs 46A (on which the rockers 45A are mounted to actuate the intake valves 78) are disposed at an angular disposition between the angle $\alpha_B$ at which the stem 80 is inclined with respect to the reference plane 28 which includes the reciprocating axis of the piston 30 and the angle $\alpha_E$ at which the push rod 35 is inclined with respect to that same plane of reference. Similarly, the studs 46B (on which the rockers 45B are mounted to actuate the exhaust valves 73) are disposed at an angular disposition between the angle $\alpha_A$ at which the stem 75 of the exhaust valve 73 is inclined with respect to reference plane 28 and the angle $\alpha_F$ at which the push rod 36 is inclined with respect to that same plane of reference. As such, the difference in the angular disposition of the studs 46A and 46B—as represented by the angle $\alpha_G$ in the drawings—assures that the actuating surface 50 on the rockers 45A will most effectively engage the valve stems 80 and that the actuating surface 50 on the rockers 45B will most effectively engage the valve stems 75. The angular disparity between the orientation of the push rods 35 and 36 is represented by the angle $\alpha_D$ on the drawings. The angle $\alpha_D$ is on the order of about three degrees (3°).

As may be observed, the push rod 35 is disposed at an angle that more closely parallels the longitudinal axis 88 of the intake valve 78. Thus, a more efficient valve train is provided. The angular difference between the push rod 35 and the intake valve stem 80 is approximately eleven degrees (11°) as compared with an angular difference of approximately eighteen degrees (18°) in a conventional cylinder head assembly 20.

As will be observed in the previous preceding paragraph, a particular structural member, component or arrangement may be employed at more than one location. When referring generally to that type of structural member, component or arrangement a common numerical designation shall be employed. However, when one of the structural members, components or arrangements so identified is to be individually identified it shall be referenced by virtue of a letter suffix employed in combination with the numerical designation employed for general identification of that structural member, component or arrangement. Thus, there are at least two groups of rockers which are generally identified by the numeral 45, but the specific, individual groups of rockers are, therefore, identified as 45A (the intake rockers) and 45B (the exhaust rockers) in the specification and on the drawings. This same suffix convention shall be employed throughout the specification.

Continuing with the description of the present invention it should now be evident that the valve heads 74 and 79 are oriented perpendicularly to the axes 86 and 88 of the valve stems 75 and 80. Thus, the angular inclination of the valve stems 75 and 80 relative to a previously described frame of reference (the second plane 28) is reflected by an equal angularity between the head portions 74 and 79 of the valves 73 and 78, respectively, and the planar deck $89_A$ by which the cylinder head 10 engages the opposed receiving deck $89_B$ on the engine block 92.

The valve seats 71 and 76 may be machined into the head 10, or they may be provided as inserts, as is well known to this art. The angles to which the base of the seats 71 and 76 are disposed relative to the deck $89_A$ are identical to the relative angle the longitudinal axes 86 and 88 of the respective stems portions 75 and 80 have with the second plane 28. That is, the relative angle at which the head portion 74 on the exhaust valve 73 is disposed relative to the deck $89_A$ is equal to $\alpha_A$, and the relative angle at which the head portion 79 on the intake valve 78 is disposed relative to the deck $89_A$ is equal to $\alpha_B$.

Figure 6:
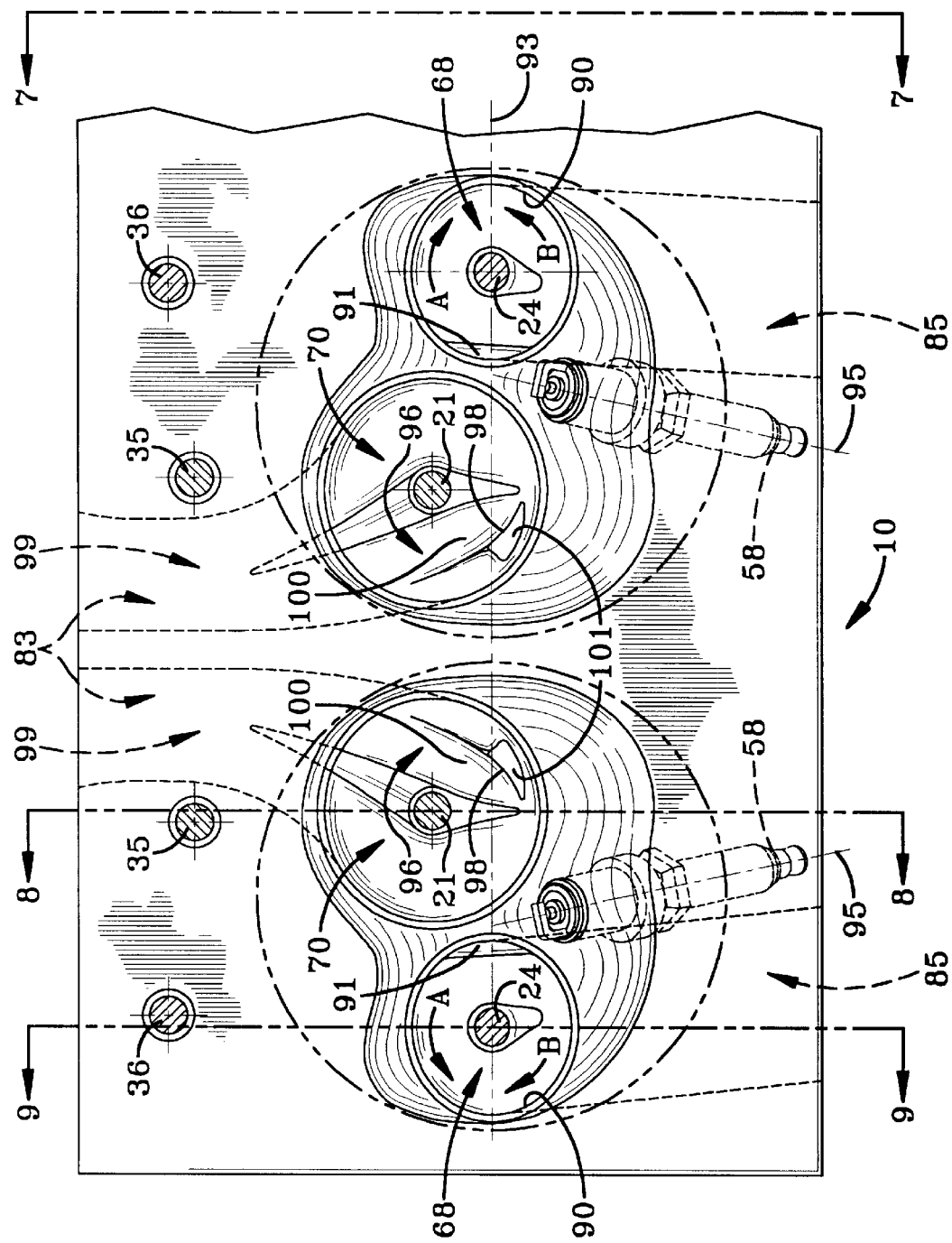
FIG. 6 is a reduced bottom plan view similar to FIG. 2, but taken substantially along line 6—6 of FIG. 5 to depict that portion of the combustion chamber included within the improved high performance cylinder head.
Figure 6A:
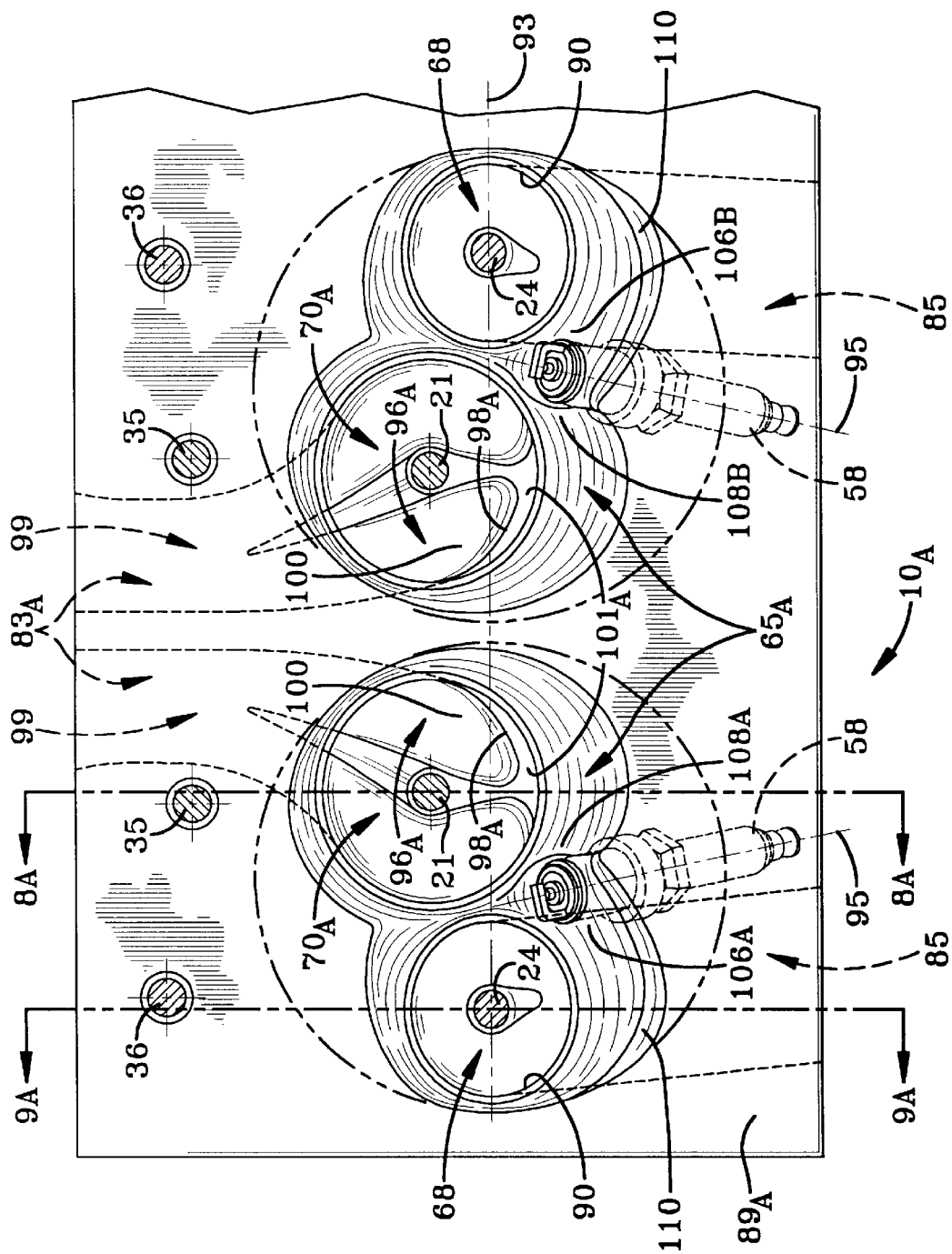
FIG. 6A is a view similar to FIG. 6 but which depicts a variation of the improved high performance cylinder head represented in FIG. 6.

As best seen in FIG. 6, the exhaust port 68 is repositioned closer to the side wall 90 of the exhaust wedge portion 66 at a location that is substantially diametrically opposite the closest point at which the intake port 70 lies to the exhaust port 68. A flow restriction 91 may be integrally cast in the exhaust passage 85 substantially adjacent the exhaust port 68 and diametrically opposite the side wall 90. This restriction 91 also reduces the amount of cross flow scavenging between the intake port 70 and the exhaust port 68. The restriction 91 is in the form of a chordal surface downstream from the exhaust port 68, as best seen in FIG. 6. However, as best represented in FIG. 6A, a slight shrouding of each spark plug 58 by undulations in the combustion chamber wall, as at 106 and 108 obviate the need for the restriction 91.

The changes to the location of the exhaust port 68 to increase shrouding, and the addition of the restriction 91 to the exhaust port 68 effects the desired flow control which creates an increase in the velocity of the exhaust gases entering the exhaust port 68 and also results in forcing the gas flow into a more circumferential flow—such as represented by arrows "A" and "B" in FIG. 6—than might otherwise be expected. The scavenging flow directly between the intake and exhaust ports 70 and 68, respectively, is thereby minimized, which results in improved fuel/air charge retention.

As is also best seen in FIG. 6, the canted disposition of the intake wedge portion 69 relative to the exhaust wedge portion 66 also permits the intake port 70 to be repositioned in laterally spaced relation from not only the exhaust port 68 but also the centerline 93 of the cylinder head 10. The repositioning and flattening of the intake port 70 allows the head 79 on the intake valve 78 to maintain the proper clearance with the top surface 94 of the piston 30 while improving the intake flow into the chamber 65 and allowing the retention of the desired compression ratio.

Figure 10:
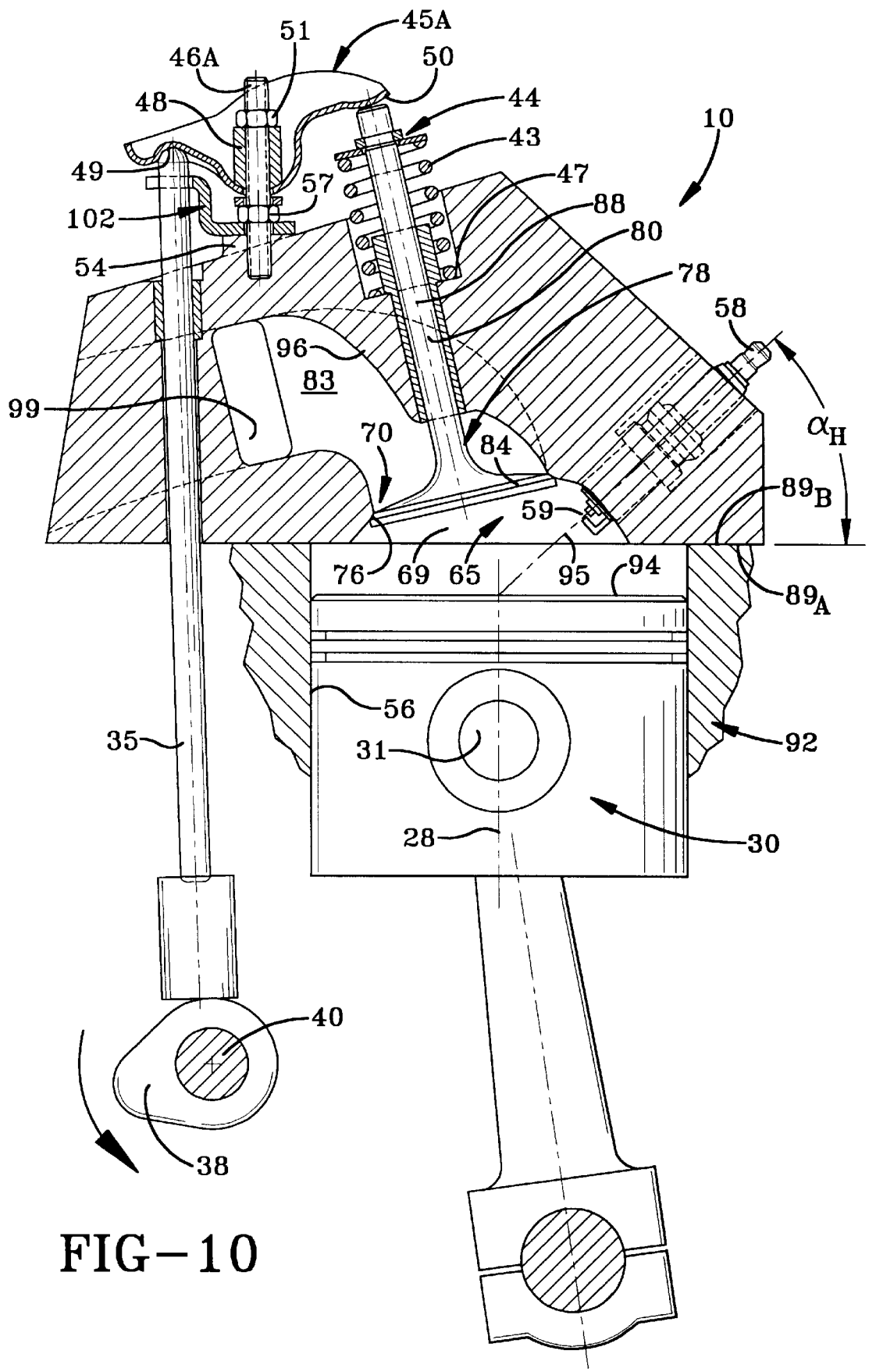
FIG. 10 is a view similar to FIG. 9, but depicting the piston at 30 degrees (30°) below top-dead-center.
Figure 10A:
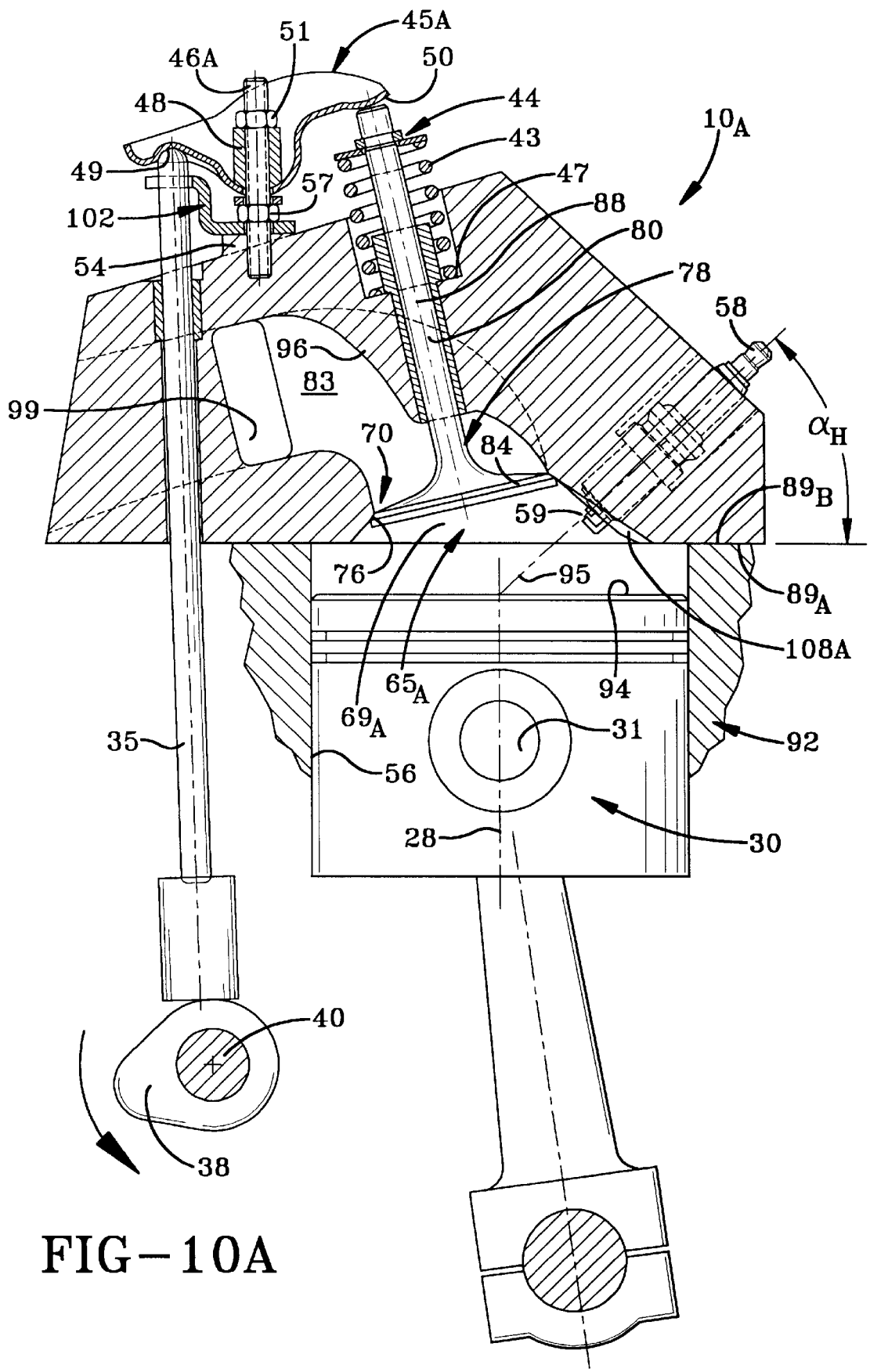
FIG. 10A is a view similar to FIG. 10 but depicting the variation shown in FIGS. 6A, 8A and 9A.
Figure 11:
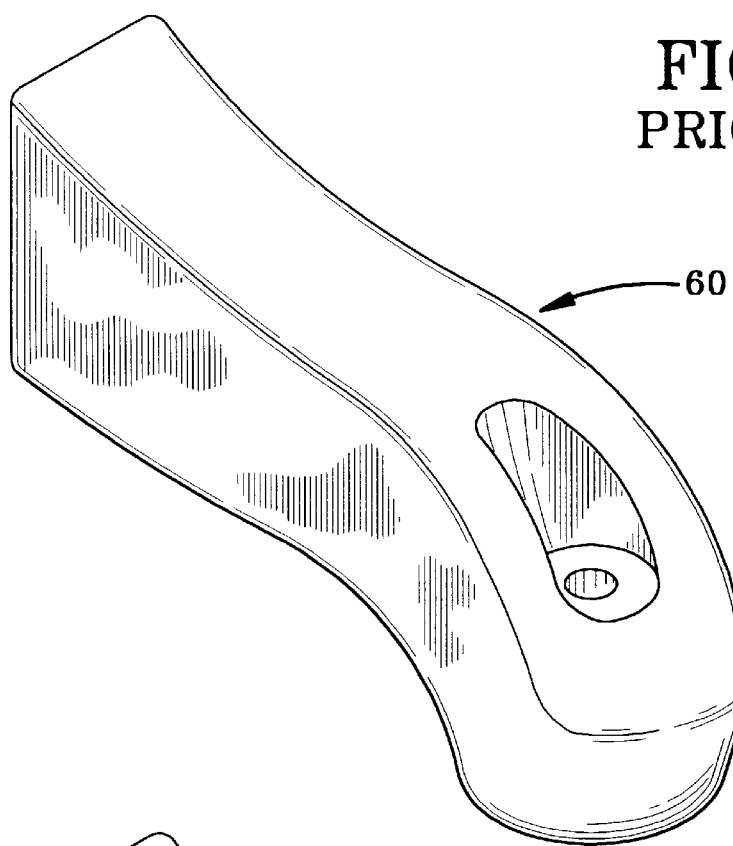
FIG. 11 is a perspective view of a cast taken of a typical intake passage that would be used in the representative prior art head depicted in FIGS. 1 through 4.

Referring to FIGS. 10 and 6 it can be seen that the relatively canted (both horizontally and vertically) wedge portions 66 and 69 also permit repositioning of the spark plug 58 to a position from which it more efficiently ignites the fuel/air mixture and provides more even loading against the top surface 94 of the piston 30 during the power stroke. The centerline 95 of the spark plug 58 is more directly in line with that portion of the chamber 65 which lies between the valves 73 and 78. More importantly, the centerline 95 of the spark plug 58 is disposed to intersect the top surface 94 of the piston 30 where the top surface 94 intersects the reference plane 28 (which delineates the centerline along which the piston 30 reciprocates). In fact, angle $\alpha_H$ was selected so that the aforesaid intersection occurs at thirty degrees (30°) before top-dead-center which has been found to be the most efficient relationship between the spark plug 58 and the piston 30.

Figure 12:
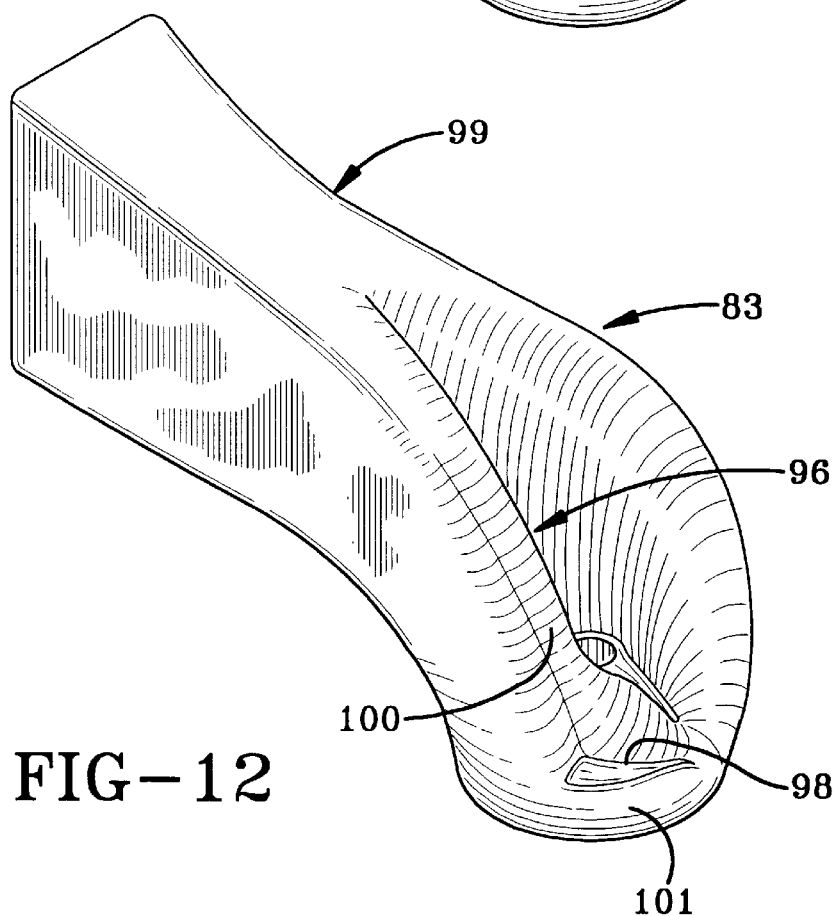
FIG. 12 is a perspective view of a cast taken of the intake passage in the improved head depicted in FIGS. 5 through 10; and, FIG. 12A is a view similar to FIG. 12 but representing the improved intake passage incorporated in the cylinder head depicted in FIGS. 6A, 8A, 9A and 10A.

In order to provide for better atomization of the fuel/air mixture, the intake passage 83 is provided with a protuberance 96 which extends into the flow area of the incoming fuel/air mixture. As best seen in FIGS. 8, 10 and 12, the trailing end of the protuberance 96 is in the form of a knife edge 98. The depiction of FIG. 12 is a cast of the intake passage 83. In other words, an inverse of the passage 83 is shown so that the protuberance 96 appears to be a recess. The intake passage 83 has a cross sectional area reduction, or choke, 99 which is upstream of the protuberance 96. The fuel droplets that may be entrained in the fuel/air mixture will move to the center of the stream, particularly as the fuel/air mass flow enters the choke 99. Almost immediately downstream of the choke 99, the intake passage 83 undergoes a radical change in direction—almost ninety degrees (90°)—before entering the intake wedge portion 69 of the combustion chamber 65. Because the fuel droplets have more mass than the vaporized fuel/air mixture, they do not follow the directional change as readily as the vapor. The fuel droplets will, therefore, impact against a reaction surface 100 on the protuberance 96 just upstream of the knife edge 98. The forceful impact of the droplets against the reaction surface 100 on the protuberance 96 causes fragmentation of the droplets, and as the fragmented droplets move across the knife edge 98 a shearing action vaporizes the fragmented droplets. A pocket 101 is provided immediately adjacent, and downstream, of the knife edge 98, and that causes turbulence, or eddy currents, in the flow of the fuel/air mass. The turbulence more thoroughly disburses the now atomized fuel droplets in the fuel/air mixture admitted into the combustion chamber 65.

Because the fuel/air mixture carries less liquid fuel into the combustion chamber 65, there will be considerably less scavenging of the fuel/air mixture. This advantage combined with the canted wedge portions 66 and 69 effects a greater fuel economy to an engine incorporating the improved cylinder head 10.

The circumferential extent of the knife edge 98 depicted in FIG. 6 extends through approximately thirty-five degrees (35°), and that circumferential extent is sufficiently ample to initiate the fragmentation of fuel droplets to the degree necessary to effect a significant improvement in fuel economy, but with only a modest increase in power. However, by extending the knife edge $98_A$ for approximately a full quadrant [ie.: approximately ninety degrees (90°), as depicted in FIG. 6A], the power output that can be achieved by the use of cylinder head $10_A$ having a modified intake passage $83_A$ is significantly increased.

It was previously explained that a letter suffix would be employed when one wishes to distinguish the use of a particular structural member, component or arrangement that is used at more than one location. Where, in the modified version of the cylinder head $10_A$ the components are the same as in the previously described embodiment such that no distinction exists, the same numerical designation shall be employed without a letter suffix. However, as previewed in the previous paragraph, when the structural members, components or arrangements are similar, but not exactly the same, a common numerical designation shall still be employed, but when the similar members, components or arrangements so identified are to be specifically designated, they shall be referenced by virtue of a letter subscript employed in combination with the numerical designation employed for general identification of that structural member, component or arrangement. Thus, there are similar, but distinct, knife edges on the two embodiments disclosed herein. As such, the embodiment previously described with respect to cylinder head 10 is identified as knife edge 98. On the other hand, the modified cylinder head $10_A$ employs a similar, but different, knife edge, and that knife edge is designated with the alphanumeric designation $98_A$ in the specification and on the drawings.

This additional alphanumeric convention shall also be employed throughout the specification.

Figure 12A:
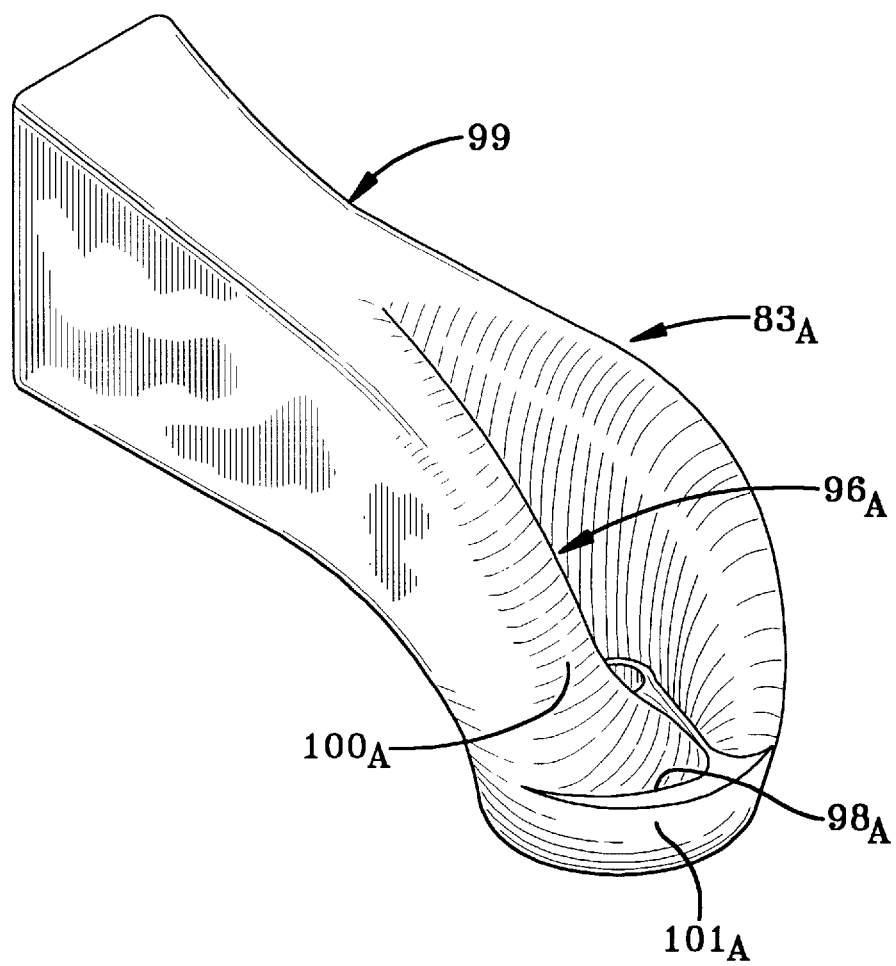

In FIGS. 6A and 12A, therefore, it can be observed that the fuel droplets will, therefore, impact against a reaction surface $100_A$ on the protuberance $96_A$ just upstream of the knife edge $98_A$. The forceful impact of the droplets against the reaction surface $100_A$ on the protuberance $96_A$ causes fragmentation of the droplets, and as the fragmented droplets move across the knife edge $98_A$ a shearing action vaporizes the fragmented droplets. A pocket $101_A$ is provided immediately adjacent, and downstream, of the knife edge 98$_A$, and that causes turbulence, or eddy currents, in the flow of the fuel/air mass. The turbulence more thoroughly disburses the now atomized fuel droplets in the fuel/air mixture admitted into the combustion chamber 65$_A$.

It should also be observed that the knife edge 98 as well as the knife edge 98$_A$ is generally disposed to extend laterally of section lines 8—8 or 8A—8A. Specifically, the knife edges 98 and 98$_A$, respectively, are provided on the "wet" side of the intake ports 70 and 70$_A$. It is well recognized, for example, that the wet side of the intake port in General Motors' engines is typically on the side of the intake port most remote from the exhaust port, whereas the wet side of the intake ports of Ford engines are typically disposed adjacent the exhaust port. The protuberance 96, or 96$_A$, as well as the reaction surfaces 100 and 100$_A$ and the knife edges 98 and 98$_A$ are appropriately located in-line with the wet side of the intake port.

It should be recognized that the shrouding accomplished by the undulations 106 and 108 does slightly reduce the fuel/air flow through the intake port 70$_A$, but that reduction is more than compensated for by the gained fuel control achieved by the configurations of the protuberances 96$_A$ and the related structure associated therewith inasmuch as the fuel vapor is maintained in suspension, thereby precluding condensation of the fuel on, or around, the spark plugs 58.

It is extremely important to recognize that this rather subtle change provides a significant increase in the brake horsepower provided by an engine using the improved cylinder head 10$_A$.

It will also be noted that a transitional chamfer 110 has been added between the deck surface 89$_A$ on the head 10$_A$ and the combustion chamber 65$_A$. The chamfer 110 extends along only that side of the exhaust port 68$_A$ on which the spark plug 58 enters the combustion chamber 65A.

Finally, it will be observed that Z-bars 102 may be employed to improve the stabilization of the respective push rods 35 and 36. The greatest stabilization results by guiding the push rods in as close proximity as possible with the outboard ends thereof. As such the stabilizing Z-bars 102 each have a base 103 that is received over one of the studs 46 to rest on the mounting boss 54 and which may secured in that position by a nut 57. An offsetting spacer web 104 extends at substantially a right angle from the base 104 and terminates in a bifurcated engaging arm 105 that extends outwardly from the spacer web 104 at substantially a right angle to embrace the push rods 35 or 36. Even though there is a slight difference in the angular disposition of the push rods, and even though the angular disposition of the studs 46 from which the stabilizing bars 102 are mounted are not identical, bifurcation of the engaging arm 105 permits ready adaptation to that slight disparity without requiring special stabilizing bars 102 for each push rod.

While only one preferred and one moderately varied embodiments of my present invention are disclosed, it is to be clearly understood that the same is susceptible to numerous changes apparent to one skilled in the art. Therefore, the scope of the present invention is not to be limited to the details shown and described but is intended to include all changes and modifications which come within the scope of the appended claims.

We claim:

1. A cylinder head for an internal combustion engine said cylinder head comprising:

a deck surface;

a combustion chamber having first and second wedge portions;

an exhaust valve port penetrating said first wedge portion;

an exhaust valve seat provided in said exhaust valve port;

said exhaust valve seat disposed at a first angle relative to said deck surface;

an intake valve port penetrating said second wedge portion;

an intake valve seat provided in said intake valve port;

said intake valve seat disposed at a second angle relative to the deck surface;

said second angle being less that said first angle;

an exhaust passage for directing an exhaust stream from the combustion chamber through the valve port in said first wedge portion; and, said different angular disposition of said exhaust and intake valve ports relative to said deck surface restricting the amount of cross flow scavenging between said intake valve port and said exhaust valve port.

2. A cylinder head, as set forth in claim 1, wherein said means for restricting further comprises:

a chordal surface lying on that side of said exhaust passage most closely adjacent said intake valve port.

3. A cylinder head, as set forth in claim 2, wherein said means for restricting acting on said exhaust passage further comprises:

a side wall in said combustion chamber;

said side wall located closely adjacent said exhaust valve port and diametrically opposite said chordal surface.

4. A cylinder head for an internal combustion engine, said cylinder head comprising:

a deck surface;

a combustion chamber having first and second wedge portions;

a first valve port penetrating said first wedge portion;

a first valve seat provided in said first valve port;

said first valve seat disposed at a first angle relative to said deck surface;

a second valve port penetrating said second wedge portion;

a second valve seat provided in said second valve port;

said second valve seat disposed at a second angle relative to said deck surface;

said second angle being less than said first angle;

said first valve ports are exhaust valve ports and said second valve ports are intake valve ports;

said cylinder head having a longitudinal axis;

a plurality of said exhaust ports being aligned along said longitudinal axis;

a like number of intake ports being aligned with each other but laterally offset with respect to said exhaust ports;

said angle at which said second valve seat is disposed relative to said deck surface is on the order of about thirteen degrees (13°);

intake passage directing an intake stream into said combustion chamber through said valve port in said second wedge portion;

a protuberance being presented within said intake passage;

a choke being incorporated in said intake passage upstream of said protuberance;

said intake passage undergoing an abrupt change of direction downstream of said choke but upstream of said intake port;

said protuberance being located in close proximity to said abrupt change of direction;

said abrupt change of direction being on the order of about ninety degrees (90°);

a spark plug being operatively associated with each said combustion chamber;

said spark plug entering said combustion chamber through said cylinder head to be disposed between said wedge portions;

a reference plane associated with each said combustion chamber and being disposed to include the vertical axis along which a piston would reciprocate with respect to said combustion chamber as well as the transverse axis of a wrist pin connected to the piston;

an extension of the centerline of said spark plug intersects said reference plane along the top surface of the piston when the piston is located at thirty degrees (30°) prior to top-dead-center.

5. A cylinder head, as set forth in claim 4, further comprising:

undulations provided in the combustion chamber wall, one undulation being located on either side of said spark plug to effect shrouding thereof.

6. A cylinder head assembly for an internal combustion engine, said cylinder head assembly comprising:

an engine head having a deck surface;

said engine bead having a longitudinal axis;

a plurality of combustion chambers successively spaced along said longitudinal axis;

each said combustion chamber having first and second wedge portions;

said first and second wedge portions being successively adjacent with each other in the directional orientation of said longitudinal axis;

an exhaust passage communicating with said first wedge portion through an exhaust port in said first wedge portion;

a valve seat circumscribing said exhaust port;

an exhaust valve means associated with said first wedge portion;

each exhaust valve means having a valve head that cooperatively interacts with said exhaust valve seat in said first wedge portion for controlling flow between said combustion chamber and said exhaust passage;

each said exhaust valve means also having a stem portion slidably mounted in said engine head on a longitudinal axis disposed at a first predetermined angle relative to said deck surface;

an intake passage communicating with said second wedge portion through an intake port in said second wedge portion;

a valve seat circumscribing said intake port;

an intake valve means associated with said second wedge portion;

each intake valve means having a valve head that cooperatively interacts with said intake valve seat in said second wedge portion for controlling flow between said intake passage and said combustion chamber;

each said intake valve means also having a stem portion slidably mounted in said engine head on an axis disposed at a second predetermined angle relative to said deck surface;

said second predetermined angle being less than said first predetermined angle;

said valve stems of said exhaust valve means being coplanar with respect to each other and said valve stems of said intake valve means also being coplanar with respect to each other but said exhaust valve stems are non-coplanar with respect to said intake valve stems; and, push rod and rocker arm means operatively disposed in said engine head for operating said exhaust and intake valve means.

7. A cylinder head assembly, as set forth in claim 6, wherein:

said first angle is on the order of about twenty-three degrees (23°); and, said second angle is on the order of about thirteen degrees (13°).

8. A cylinder head assembly, as set forth in claim 6, wherein said intake passage comprises:

means in said intake passage for inducing an increased velocity in the fuel/air stream having liquid fuel droplets carried thereby;

protuberance wall means downstream of said velocity means to increase the velocity of said fuel/air stream;

said protuberance means being substantially aligned centrally of the fuel/air stream for interacting with, and inducing shearing of, liquid fuel droplets within the fuel/air stream.

9. A cylinder head assembly, as set forth in claim 8, wherein said exhaust passage comprises:

means for restricting the amount of cross flow scavenging between said second valve port and said first valve port, said means formed therein at a location adjacent said exhaust valve seat.

10. A cylinder head for an internal combustion engine said cylinder head comprising:

a deck surface;

a combustion chamber having first and second wedge portions;

an exhaust valve port penetrating said first wedge portion;

an exhaust valve seat provided in said exhaust valve port;

said exhaust valve seat disposed at a first angle relative to said deck surface;

an intake valve port penetrating said second wedge portion;

an intake valve seat provided in said intake valve port;

said intake valve seat disposed at a second angle relative to the deck surface;

said second angle being less that said first angle;

an exhaust passage for directing an exhaust stream from the combustion chamber through the valve port in said first wedge portion; and, said first and second wedge portions of said combustion chamber restricting the amount of cross flow scavenging between said intake valve port and said exhaust valve port.

* * * * *